(12) United States Patent
Caci

(10) Patent No.: US 6,348,946 B1
(45) Date of Patent: *Feb. 19, 2002

(54) VIDEO CONFERENCING WITH VIDEO ACCUMULATOR ARRAY VAM MEMORY

(75) Inventor: Joseph Claude Caci, Owego, NY (US)

(73) Assignee: Lockheed Martin Corporation, Bethesda, MD (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/911,600

(22) Filed: Aug. 14, 1997

(51) Int. Cl.[7] .............................................. H04N 5/202
(52) U.S. Cl. ...................................... 348/254; 358/455
(58) Field of Search ................................ 348/362, 379, 348/256, 364, 254, 229, 230, 255, 234, 235, 236, 237, 238, 272, 674, 675, 370, 342, 166; 358/455; H04N 5/202

(56) References Cited

U.S. PATENT DOCUMENTS

| | | |
|---|---|---|
| 3,603,725 A | 9/1971 | Cutler |
| 4,546,383 A * | 10/1985 | Abranatic et al. ............. 358/85 |
| 4,654,877 A * | 3/1987 | Shimoni et al. .............. 382/56 |
| 4,667,233 A | 5/1987 | Furukawa |
| 4,719,503 A | 1/1988 | Craver et al. |
| 4,935,953 A | 6/1990 | Appel et al. |
| 5,151,784 A | 9/1992 | Lavagetto et al. |
| 5,153,720 A | 10/1992 | Kawai |
| 5,258,835 A | 11/1993 | Kato |
| 5,363,205 A | 11/1994 | Shou et al. |
| 5,371,533 A * | 12/1994 | Lewins ....................... 348/166 |
| 5,379,351 A | 1/1995 | Fandrianto et al. |
| 5,389,965 A | 2/1995 | Kuzma |
| 5,392,223 A | 2/1995 | Caci |
| 5,465,118 A * | 11/1995 | Hancock ..................... 348/396 |
| 5,534,945 A * | 7/1996 | Edgar ......................... 358/455 |
| 5,822,464 A * | 10/1998 | Metcalfe ..................... 358/455 |
| 5,847,715 A * | 12/1998 | Fujita et al. ................ 345/443 |
| 5,923,380 A * | 7/1999 | Yang et al. .................. 348/586 |
| 5,926,280 A * | 7/1999 | Yanagishi et al. ......... 348/166 |

OTHER PUBLICATIONS

"The Foundations of Computer Architecture and Organization;" Tomek, Ivan; ©1990. W.H. Freeman and Company Publisher Sections 6.7 & 6.8; p. 225–232 ad p. 241–246.*

* cited by examiner

Primary Examiner—Tuan Ho
(74) Attorney, Agent, or Firm—Richard L. Aitken; Venable

(57) ABSTRACT

In a video conferencing system, digital data representing pixels of a selected scene are stored in a Video accumulator Array Memory cells (VAM), each cell having memory with several register structures and having the capability of processing the digital data to facilitate compression of the digital data. The VAM has the ability to tell the processor information about the temporal nature of the video data without requiring the processor to first read the data and then test the data. In accordance with the present invention, the capability of processing the video data is designed directly in the memory function as they are stored. The memory array, by providing a capacity of temporal processing wherein the digital data in one video frame can be logically interacted with another video frame later in time, can make a significant reduction in the bandwidth required to transmit a video frame. In a scheme for representing gray scale luminosity, the luminosity is digitally represented by the plus and minus differences from the mid point of the gray scale. A color video camera, in addition to generating color separation pixel values, also generates gray scale luminosity values which include a steady state infrared component provided by steady sate illumination of scene in order to reduce the adverse effects of fluorescent lighting.

4 Claims, 7 Drawing Sheets

VIDEO CONFERENCING WITH VIDEO ACCUMULATOR ARRAY VAM MEMORY

This invention relates to video signal acquisition, processing and transmission systems and, more particularly, to such processing systems as video conferencing and other similar systems where large amounts of high volume raw data must be quickly processed in real time.

In video picture signal acquisition and transmitting systems, a video camera generates an analog signal or signals representing the scene detected or viewed by the camera. The signal may represent the scene in monochrome as a shades of gray or it may represent the scene in color by signals for each of the three color separations. e.g., red, green and blue. Analog samples of the signals are processed by one or more charge-coupled devices (CCD's). Each cell in a CCD stores a signal sample and represents a pixel or a color component of a pixel of the scene. An analog-to-digital converter converts the analog signals stored in the charge-coupled device or devices into digital values which are stored in a random access memory (RAM). The digital signals may be stored in a RAM known as a VRAM which is a RAM specifically designed to store digital video signals. The VRAM provides two paths into memory, one for writing digital data into the memory and the other path for reading data out of the memory.

When the video signal is color video, the scene is detected through filters corresponding to the three color separations to generate three color video signals., i.e., a red video signal, a green video signal and a blue video signal. At this point, the analog signal has changed to digital format and is ready for processing. It is stored in digital memory. One memory plane is provided for each color where each memory location corresponds to one pixel. In VRAM or dual port memory, the processor must read the memory and perform the processing algorithm. The common processor which may be a microprocessor or bit slice processor must fetch the data across the data bus and into a register set. Some processors may be scalar or super scalar having the capability of fetching an instruction and performing an instruction within the same clock cycle. Some processors may have floating point processors which have the capability of performing a multiply or divide into two or even one clock cycles. Some processors may have instruction extensions for performing specialized functions. All these processor types still require the read and write cycle to retrieve and store the data from memory. Some processors have the capability of modifying the memory directly but they do so through extended clock cycles and thus offer no throughput advantage. If a way could be found for a processor to look ahead of temporal data in a memory bank without executing bandwidth intensive read write cycles for each memory address then algorithm processing speeds for video conferencing applications could be significantly improved. This invention achieves that purpose.

SUMMARY OF THE INVENTION

The prior art as described above requires a large downstream effort to achieve video data compression. The random access memory array employed in the system of the invention, called a VAM, has the ability to tell the processor information about the temporal nature of the video data without requiring the processor to first read the data and then test the data. In accordance with the present invention, the capability of processing the video data is designed directly in the memory function as they are stored. The memory array, by providing a capacity of temporal processing wherein the digital data produced by the A/D converter in one video frame can be logically interacted with another video frame later in time, can make a significant reduction in the bandwidth required to transmit a video frame. Specifically, in accordance with the invention, each pixel is provided with an addressable memory cell plus additional storage and control registers. Present technology has the ability to pack large amounts of memory storage into a small space. For example, this trend has produced 16 megabyte RAM package from a 1 megabyte package. This invention seeks to take advantage of this increased density capacity, by trading additional RAM density for functional capacity. Typically, one memory location will hold the pixel value at time To and will hold the same pixel at time $T_1$. That is one memory location will hold and store the same pixel value from two distinct times. Additionally the memory location will act upon the two values using a processor set criteria. Depending on outcome, the memory location will set a flag and make the outcome results available as data to the processor, all the while the data last written to the memory location is still available as data. The outcome result is a radix reduced representation of the $T_1$ pixel value. This radix reduced pixel value will allow the use of reduced transmission bandwidth without noticeable lost picture quality.

In accordance with another aspect of the invention having to do with setting the memory cell criteria, the video data is compressed by making use of gray scale mathematics. In this scheme, the luminosity of video data is represented by the difference, plus or minus, from a mid point in the gray scale ranging from a maximum gray scale luminosity, e.g. white, and a minimum luminosity, e.g. black. Note that any monochromatic color value, e.g. red, green or blue, as well as gray scale values, works well with this scheme. The luminosity of regionally located pixels having the same sign are organized in groups and the sign of the luminosity values of the pixels in the group is indicated by the least significant bit of the luminosity value of the first pixel data value of the group. By means of this scheme, further additional bandwidth required to represent the luminosity value is reduced.

In accordance with another aspect of the invention, the video camera in addition to generating color separated pixel values corresponding to a detailed scene also detects a gray scale value. The scene is illuminated with infrared light under video processor control which adds a controlled intensity component to the detected gray scale pixel values. The gray scale values with the infrared component can be used to reduce the distortion caused by illumination of the detected scene within the office environment typically using AC powered flourescent lighting.

In accordance with another aspect of the invention, the purpose of a VAM cell is to off load comparative processing from the computer processor, back plane and bus systems. The processor need only be concerned with identifying image boundaries and image motion from special VAM signals. The VAM cell is capable of generating a signal representing processing results which can then be scanned by the processor at a much higher speed than typical memory read and write operations. The processor then has time to modify and organize the algorithm to meet changing conditions without lost data or delaying data transmission.

Further objects and advantages of the invention will become apparent as the following detailed description of the invention unfolds when taken in consideration with the following drawings.

DESCRIPTION OF THE PREFERRED EMBODIMENT

The present invention is designed to be used in conjunction with the video processor disclosed in U.S. Pat. No. 5,392,227, which is hereby incorporated by reference.

Figure 1:
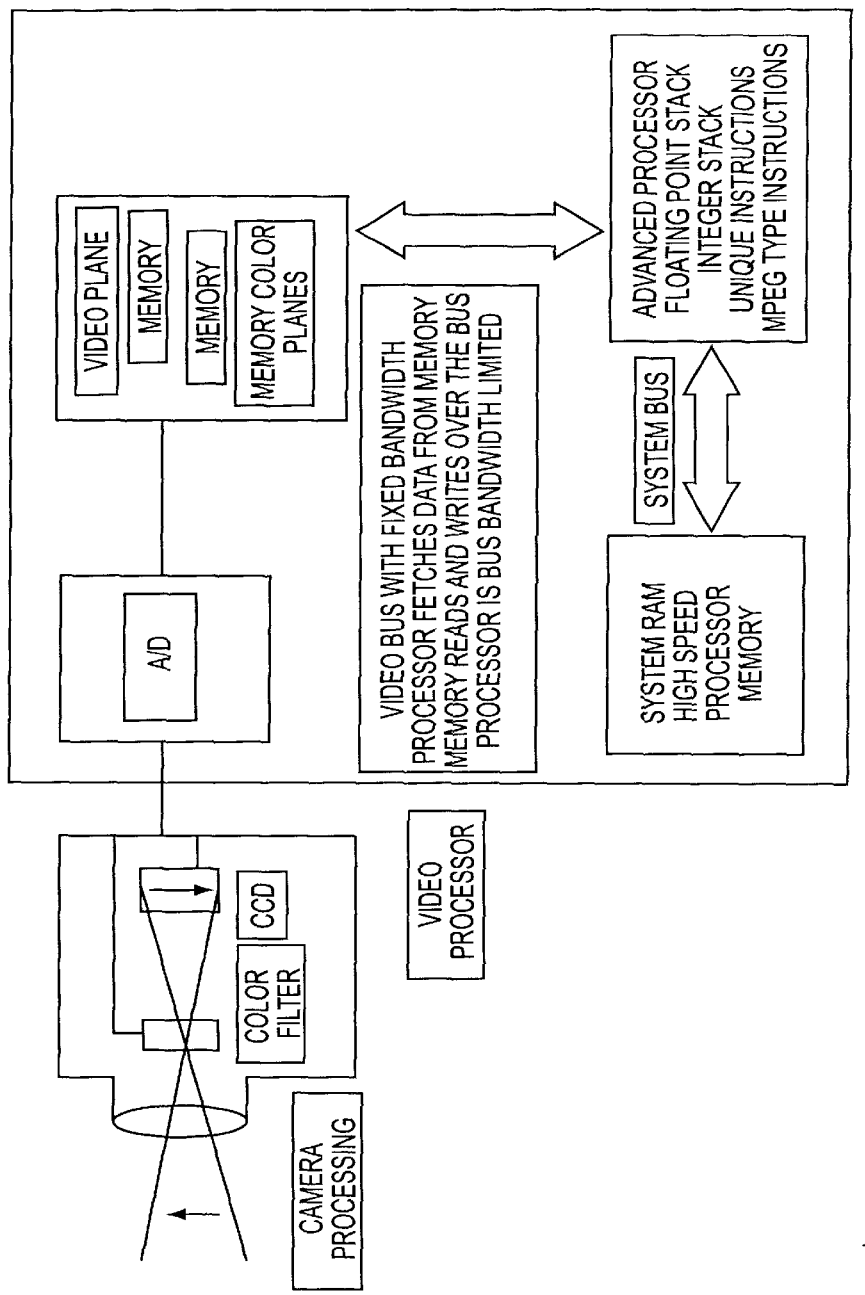
FIG. 1 titled Prior Art shows a typical arrangement in which a camera is connected to a video processor. The video processor has an A/D converter and RAM or VRAM for storing the digital video data. A processor is connected to the RAM and performs an algorithm on the video data. The processor is required to read an addressable Video Plane RAM location and may perform an operation on the data and write it to System RAM. In this arrangement, the processor has no advanced knowledge of the data in the RAM. It must read the data before performing any operation on the data. Processing results are typically stored in System RAM and the next stage of the algorithm would move the processed data from System RAM to the next processing point.
Figure 2:
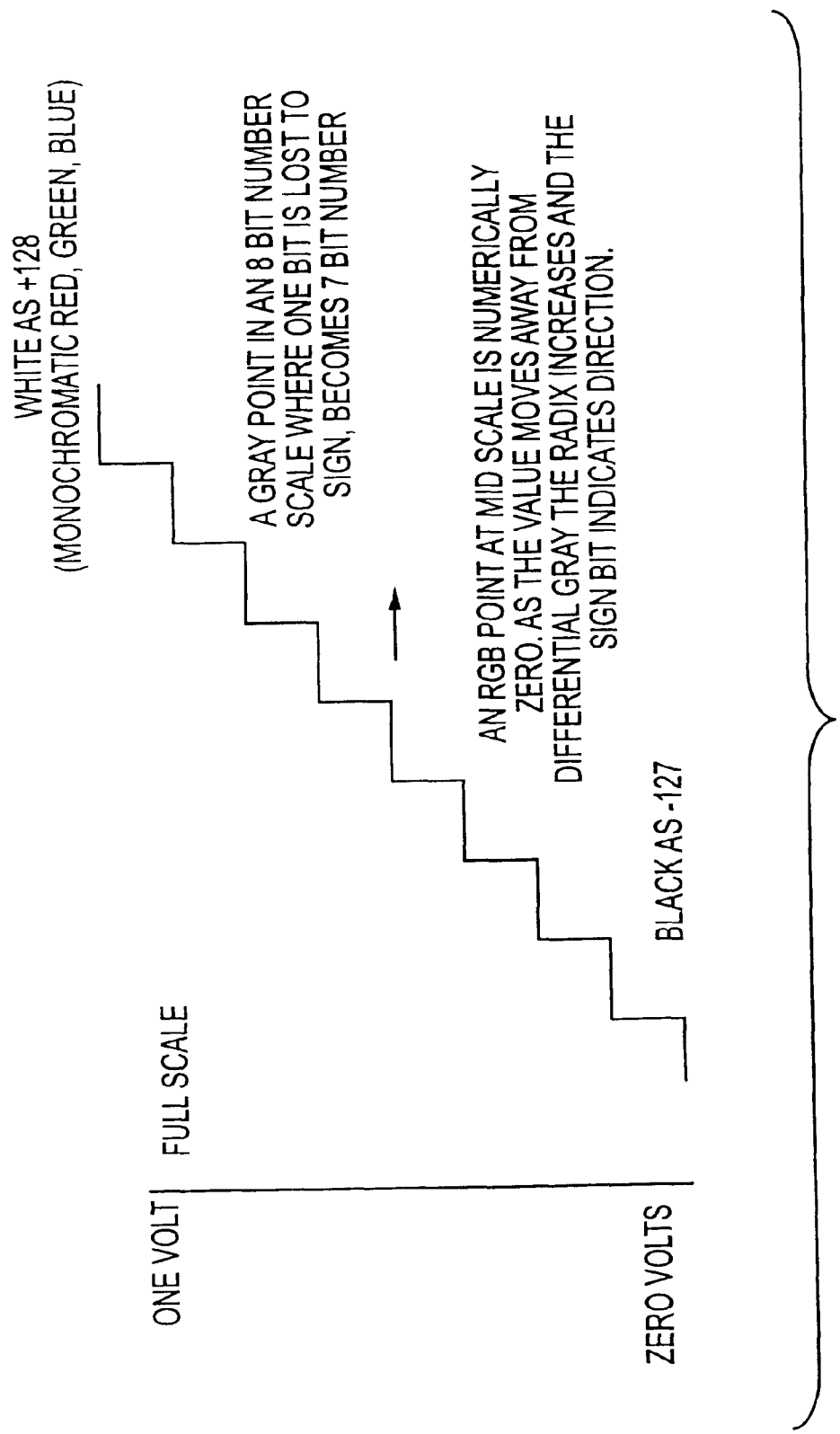
FIG. 2 shows how the video number range can be designed to reduce the binary radix with minimal impact to pixel quality. In this scheme, the system assumes the ground state for all video is the middle of the curve. Therefore, a blank screen will be middle gray. It will be middle gray in a color screen or black and white screen. In a color screen, all color components have the same middle gray value and thus when combined, produce middle gray. A black and white pixel or color pixel component is compared to the middle gray value. It's displacement from middle gray then becomes the data. In practical video conferencing usage and through the use of controlled IR illumination, this displacement will be small and statistically centered around middle gray. Therefore the radix of the displaced values can be smaller than the value of the pixel they represent and still have the same accuracy.

In video camera systems now in use, the digital representation of video corresponds to its analog representation; that is, the luminosity is represented digitally directly proportional to an analog voltage relative to zero volts. Accordingly, full scale binary numbers are required to represent the analog voltage. The stair step curve shown in FIG. 2 represents digital luminosity values from 0 to 15 requiring a binary number with a radix of four. In this example, 0 would represent a block pixel or a pixel with no luminosity and 15 would represent a pixel with maximum luminosity. In a conventional system, luminosity is typically represented by a binary number being a radix of 8 giving 256 different levels of luminosity. In a method of the present invention, a reference point is established at or near the middle of the analog scale. This reference point is identified as the middle gray scale point or mid gray point, as shown in FIG. 2. The pixel luminosity is then represented digitally by the difference of the analog signal from this mid gray point. Thus, in this system, a black pixel would be represented by a value of −8 and a pixel with a maximum luminosity would be represented by value of +7. The middle gray point is represented by 0. By representing a minimum value of −8 thus a pixel with maximum luminosity would be represented by a value of +7. The radix required to represent an absolute value of 8 is smaller than a radix required to represent an absolute value of 16. The middle gray or monochromatic point is 0. By representing a pixel luminosity in this manner, the radix required to represent the luminosity is reduced. However, in this scheme of representing luminosity, information must be transmitted as to the sign of each digital value representing which side of the middle gray point the luminosity value lies. To provide this information, the pixel value transmitted in sequence are divided into groups wherein each group will present a sequence of pixels having the same sign; that is, representing luminosity on the same side of the middle gray point. The probability of pixel distribution favors large numbers of luminosity values being grouped on the same side of the middle gray point. The least significant bit of the luminosity of the first pixel in a block will represent the sign for the luminosity of all the pixels of the block. The loss of the least significant bit of the luminosity of the first pixel will result in the loss of information, but the loss will be minor and not noticeable. The start of each block is signaled to the distant end by means of a code. The coding scheme is well described in U.S. Pat. No. 5,392,223, reference to FIG. 4 codes to represent video and audio weighting plans and reference to FIG. 15 workstation packet control.

Figure 3:
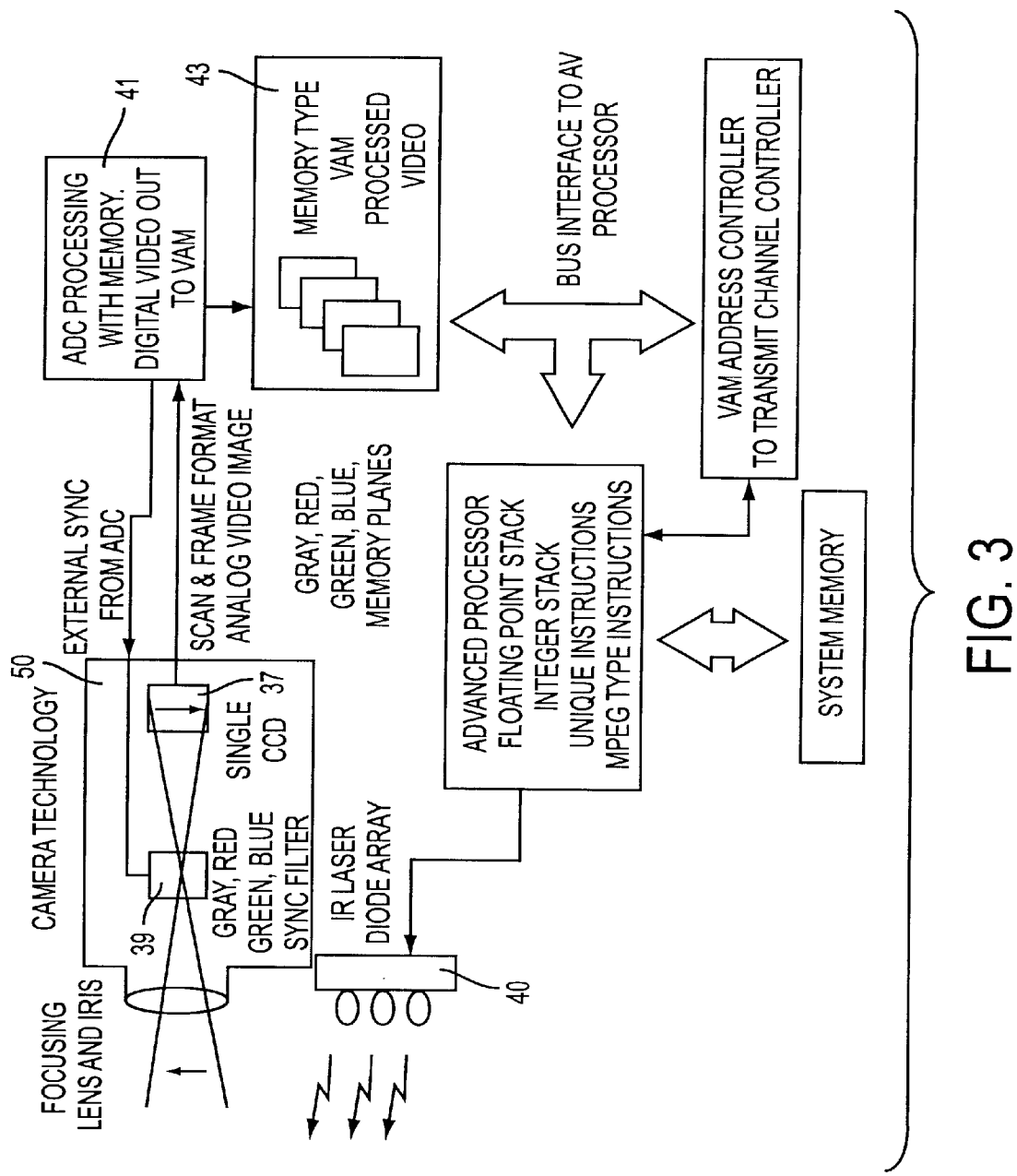
FIG. 3 is a block diagram of a video conferencing system showing the architecture for the VAM to drive the video transmit channel controller. The 4 VAM color planes are shown in a preferred embodiment situation. In this arrangement, the processor sets up the VAM to produce reduced radix video data. This data is then available directly to a transmit channel controller. The processor can monitor the data and scan the error codes and Z flags as the VAM process functions. If there are sufficient error codes and or Z flags than the processor can intervene at the exact locations where the codes and Z flags originated. The processor has ample time to generate code changes as shown in FIG. 3 of U.S. Pat. No. 5,392,223.

FIG. 3 shows a video conferencing system employing a color video camera of the sequential type wherein red, green and blue filters in synchronous filter 39 are used to generate red, green and blue video signal frames which are imaged in sequence on the charge coupled device 37. In addition to the color video signals, a fourth video frame is generated which may be a gray scale video with IR content representing the scene in black and white or gray scale. As indicated above, red, green and blue filters are interposed in sequence in the path of the light between the camera lens and the CCD 37 so that the CCD converts the visual image to an electrical format in successive frame intervals. To generate the gray scale video, a infrared filter or neutral gray filter may be used so that the gray scale is received by the CCD 37 in the fourth frame interval. Thus, the synchronous filter interposes the color filters in sequence followed by a frame in which no color filter is present. In accordance with the preferred embodiment, the scene is illuminated with infrared light by an infrared laser diode array 40. As a result, when the gray scale video frame is being detected by the CCD without any filter interposed by the synchronous filter, this frame will also include an infrared component. An iris may be provided in the synchronous filter wherein the size of the aperture and thus the intensity of the light reaching the CCD may be controlled. By using a feedback signal to control the intensity of illumination by the diode array 40 or to control the iris in the synchronous filter, the values of the gray scale pixels can be measured and controlled, and indirectly the color pixels as well. This control enables the radix of the pixel values to be controlled while maintaining hue or color accuracy.

The gray values are buffered by the controlled illumination of the infrared light. This gray value may be mathematically used to buffer and smooth out in time the values of color as well. The mathematical function referred to here is the general application of convolution theorems as found in the practice of complex algebra. A reference for complex algebra is *Complex Variables and the Laplace Transform for Engineers* by Wilbur R. LePage and published by the McGraw-Hill Book Company. The design of the VAM is such that it promotes the use of these mathematical functions in the memory itself which reduces processor overhead thus enabling more pixels to be processed per unit time. This description of the VAM cell uses addition and subtraction as two mathematical operations, but the VAM cell can also incorporate other digital mathematical functions between the register structures such as multiplication, division and binary operations such as AND and OR.

The use of the infrared illumination of the scene while generating a gray scale image incorporating the infrared component acts as an effective countermeasure to overcome the negative effect of AC powered fluorescent light in video conferencing situations. The infrared illumination enables a steady state illumination of the scene to be achieved and, accordingly, suppresses illumination fluctuations which require more processing work. As shown in FIG. 3, each video frame detected by the CCD is converted to a digital value and stored in a separate frame of the VAM array 43 for latter processing of the digital data.

Figure 4:
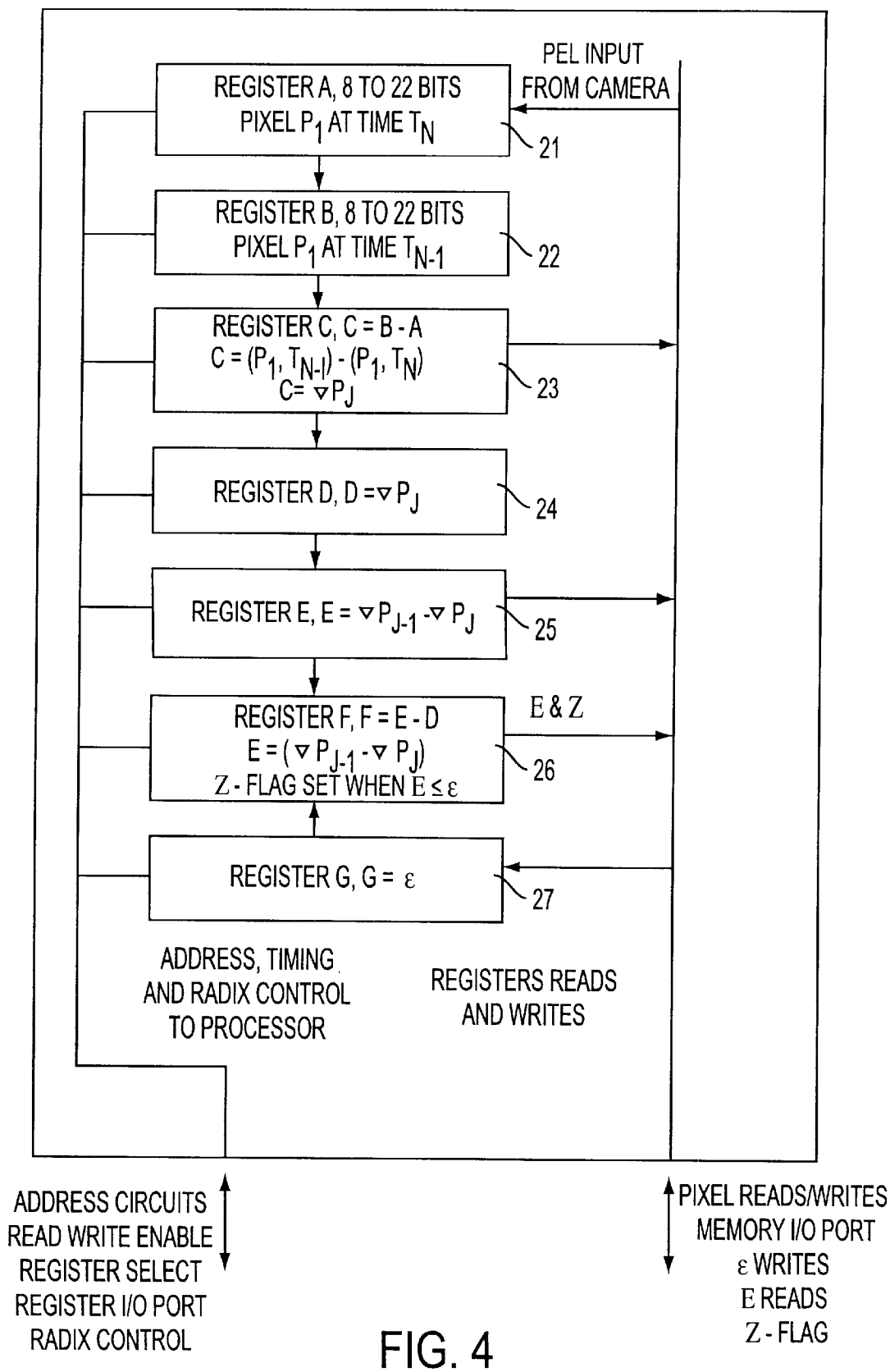
FIG. 4 is a block diagram of a VAM temporal configuration and shows how the memory, registers, address and control structures interact. The microchip design mechanics of developing dual port memory are well understood and not presented here. Two active Input and Output ports are required, one for regular memory address and control lines otherwise referred to as Register A 21 and the other for the upper level register sets and control signals. The select lines can control which register is output and on which port it appears. The processor has the ability to set the radix control for a cell while the cell is being read or written to with video data.
Figure 5:
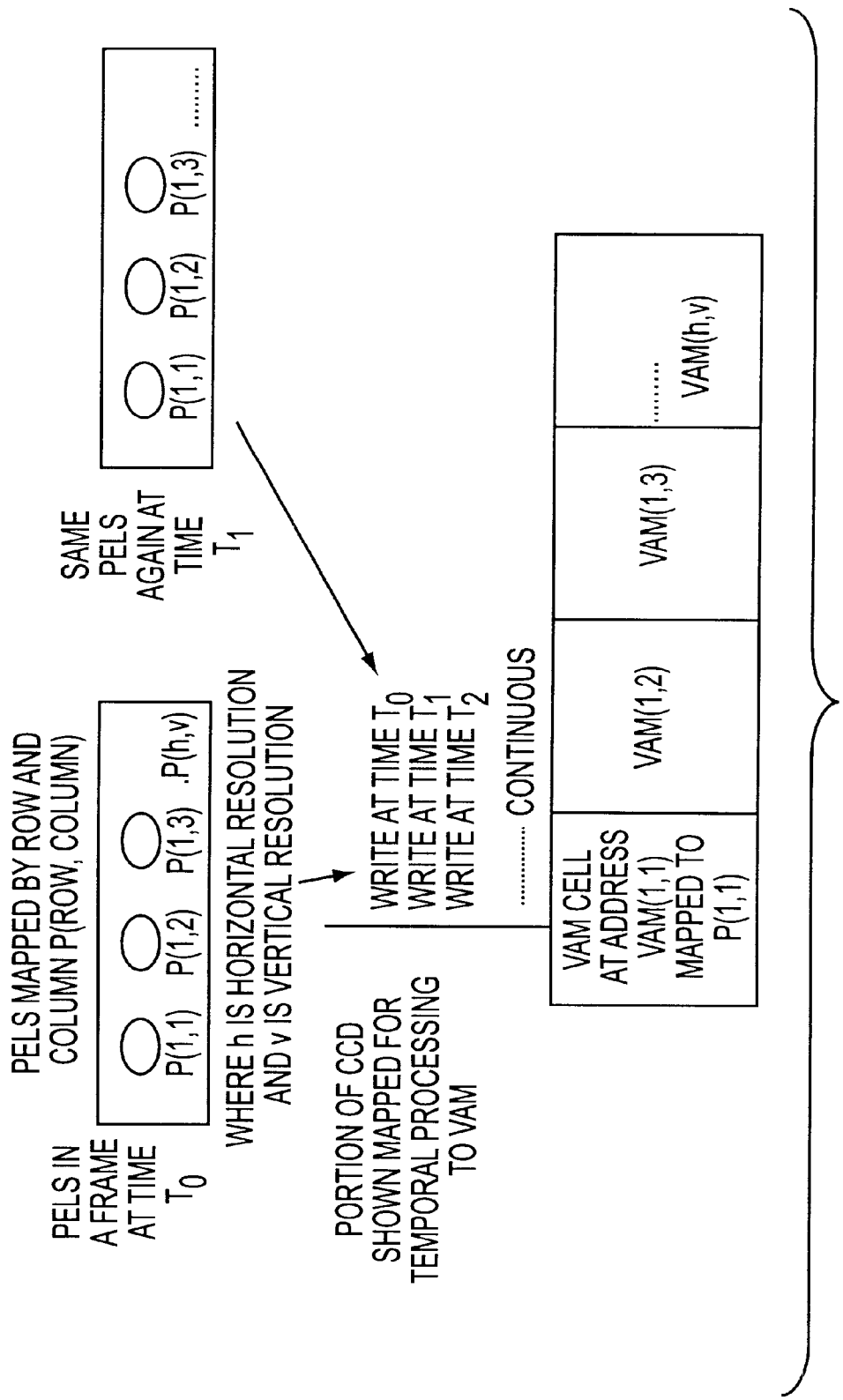
FIG. 5 shows how PELs could be mapped to a VAM cell to achieve temporal processing. In a temporal arrangement, the complete video frame as composed into N by M pixels by the processor is written to VAM at frame time $T_0$ and again at frame time $T_1$. As frames are written to VAM the previous data becomes part of the radix reduction process. This is a continuous process, automatic in nature.

In the system of the invention shown in FIG. 3, a video camera 50 detects a scene to be processed. The analog to digital converter 41 converts each CD pixel to digital representation which is stored in VAM 43. The VAM 43 is provided with multiple input and output ports for storing and sending out digital data independent of flag and signal lines. The VAM should be initialized prior to use, that is each cell set to zero. Each VAM addressable location or cell is made up of a plurality of stages. The VAM architecture is shown in FIG. 4, and contains several structures in the cell including the memory. In this simplified form of the invention, the detected scene is represented in black and white whereas the analog signal values stored in the CCD represents the luminosity of the corresponding pixels in the scene. The preferred embodiment of a single random access memory cell is shown in FIG. 4, has seven structures or stages capable of functioning as registers 21 through 27. Each cell contains a digital storage location corresponding to each pixel of the detected scene. The memory portion is referred to as Register A 21 and thus corresponds to a pixel in the scene being detected. The VAM cell may be organized in several ways but this description will show only 1 way. It will be apparent at the end of the discussion that other organizations are possible. Each way is an approach to the same means. The end means is to reduce or eliminate redundant video data. In the VAM 43, the address circuitry is combined with two or more accumulators using a technique called bit slice architecture. In bit slice architecture the subelements of the cell are individually addressable and can be reconfigured into new logic arrangements. In the example of FIG. 3, we will use Registers A 21, B 22, C 23, D 24, E 25 F 26 and G 27. The size of the registers can be adjusted under processor control. The two main temporal registers are labeled A 21 and B 22. A 21 and B 22 are arranged in a stack. As data is write latched into register A, typical memory address and timing circuits control the sequencing. Upon conclusion of the write cycle, register B 22 is subtracted from register A 21. The results are pushed into register C 23. As the data is pushed into C 23, register A 21 is pushed into B 22 and register A 21 remains and is available to be read as ordinary memory. Register C 23 contains the subtraction results and register B 22 contains the pixel value of Register A from time $T_0$. At the beginning of this operation, register B 22 was zero. The subtraction of zero is essentially a null operation but the contents of register A are pushed into B. At time $T_1$ a new pixel value is written to register A 21. On the second write operation a new value of $P_1$ shown in FIG. 5 is loaded into A. At the conclusion of the write cycle, B 22 is subtracted from A and pushed into register C 23.

Figure 7:
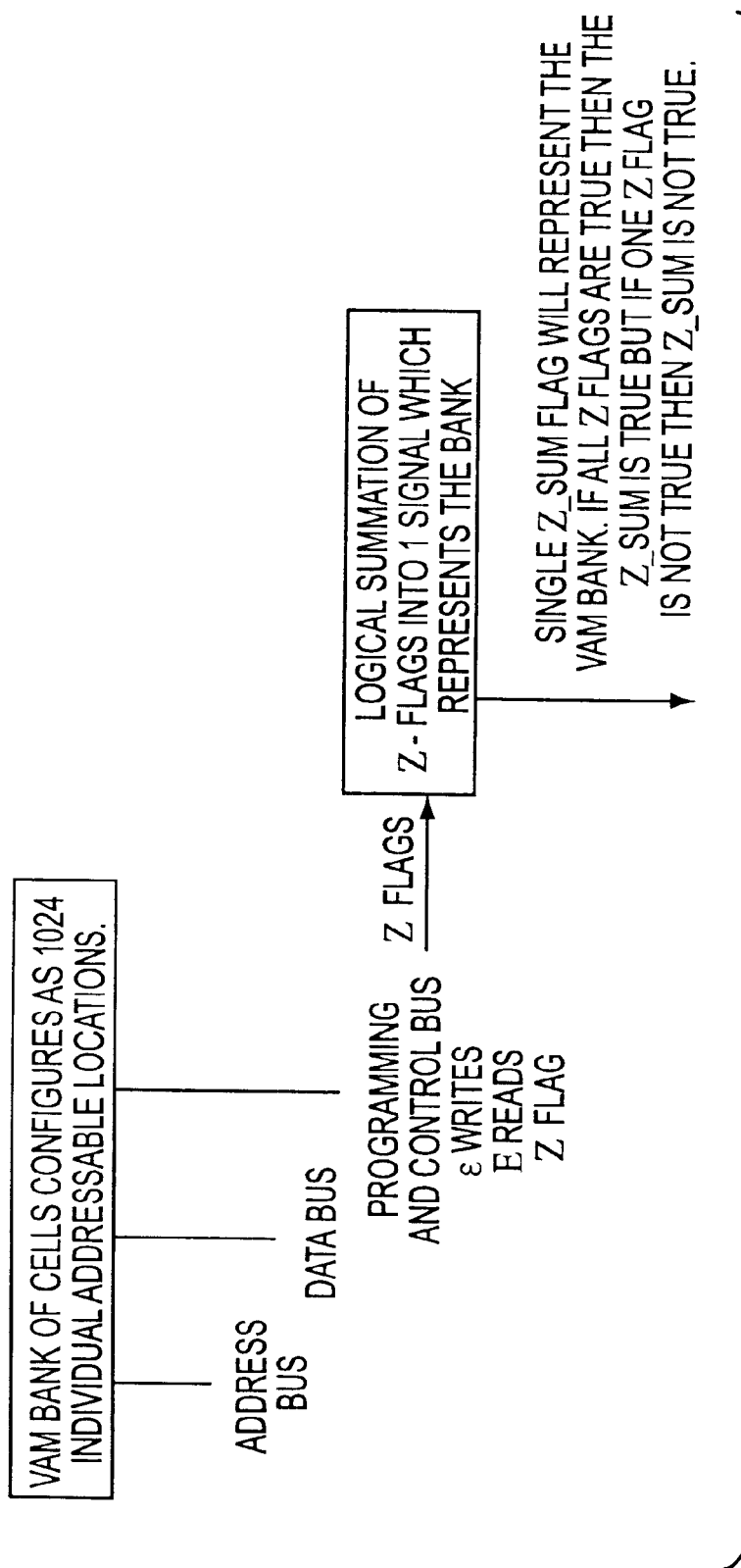
FIG. 7 shows how VAM may be logically organized so that the processor may scan a single signal which represents an aggregate of flags. The figure depicts VAM organized as a memory bank of 1024 cells. The organization is shown for convenience only. It could just as easily be organized as 1 megabytes. The flags from the memory bank organization can be aggregated into a single flag and that flag would represent 1024 individual cells. A flag thus set would indicate one or more individual cells with flags set. A scan of a single line would proceed faster than a scan of a thousand lines. Only those memory banks with set flags would thus be serviced.

Register C 23 contains the temporal difference between the same pixel at two different times. The contents of register C 23 are also pushed into register D 24. On the third write, the contents of register C 23 are pushed into register D 24. On the forth write to the VAM cell, the contents of register D 24 are subtracted from register C 23 and stored in register E 25. Register E 25 contains $\xi$ which is the difference between registers D 24 and C 23, and which is compared with $\epsilon$. The value $\epsilon$ is the threshold value of the temporal pixel difference described in U.S. Pat. No. 5,392,223 and it is predetermined by the A/V Processor using the AI software described in that reference. It is loaded into the specific VAM cell of register G 27 as part of an initialization process and updated in the course of operations as conditions require. Note that there is no requirement that all VAM cells have the same value $\epsilon$. The value $\epsilon$ should be tuned for various regions of the frame. That way processing resources can be assigned those regions that require it. Register E 25 is compared with register G 27 and if register E 25 is greater than G 27 then the Z flag is not true and E 25 contains the temporal difference. If E 25 is less than G 27, then E 25 is set to zero and the Z flag is true. The condition of the Z flag, not true or true, for each cell of the VAM is set in register F. Note that E 25 does not actually become zero, it is not required to. The processor only needs to read the Z flag at the VAM address to know if the contents are zero. The Z flag also has second purpose. It is an associative signal to the processor to signal those addresses which can be grouped into video frame processing blocks as shown in FIG. 11 of U.S. Pat No. 5,392,223. A key advantage of the Z flag is that it may be used to represent a large amount of memory so that the processor is not required to read each Z flag from each VAM cell. The flags from each cell can be aggregated as shown in FIG. 7. The processor can scan the memory bank which represents a large memory block in the example of FIG. 7. The Z_SUM signal is true only when all Z Flags are true. If one or more Z Flag signals are not true then Z_SUM is not true. The size of the bank aggregated can be adjusted by the circuit design engineer for optimal performance in a specific configuration. By checking the Z_SUM flags, a processor can quickly scan large memory banks and avoid processing banks not meeting processing criteria as set by the ∈ factor. The VAM cell may be programmed to output radix controlled data such as Register C 23 or Register E 25 in autonomous operation as shown in FIG. 3. This data can then be made available to a direct memory access controller along with the cell's address for automatic operation so that the processor only needs to supervise the operation. Register C 23 is the direct difference between a Pixel at two times and Register E 25 is the acceleration of data change. If Register D 24 is the same value as Register E 25, then the data change velocity is constant and therefore 0. But if the data rate change is not constant, then Register E 25 will have a positive or negative value indicating increasing or decreasing data rate change. This is a heads up indicator to the processor of how the data rate is changing which may require a change in the processing algorithm. This factor can be important in predicting video processing changes and provide advance warning to the processor of said change.

Figure 6:
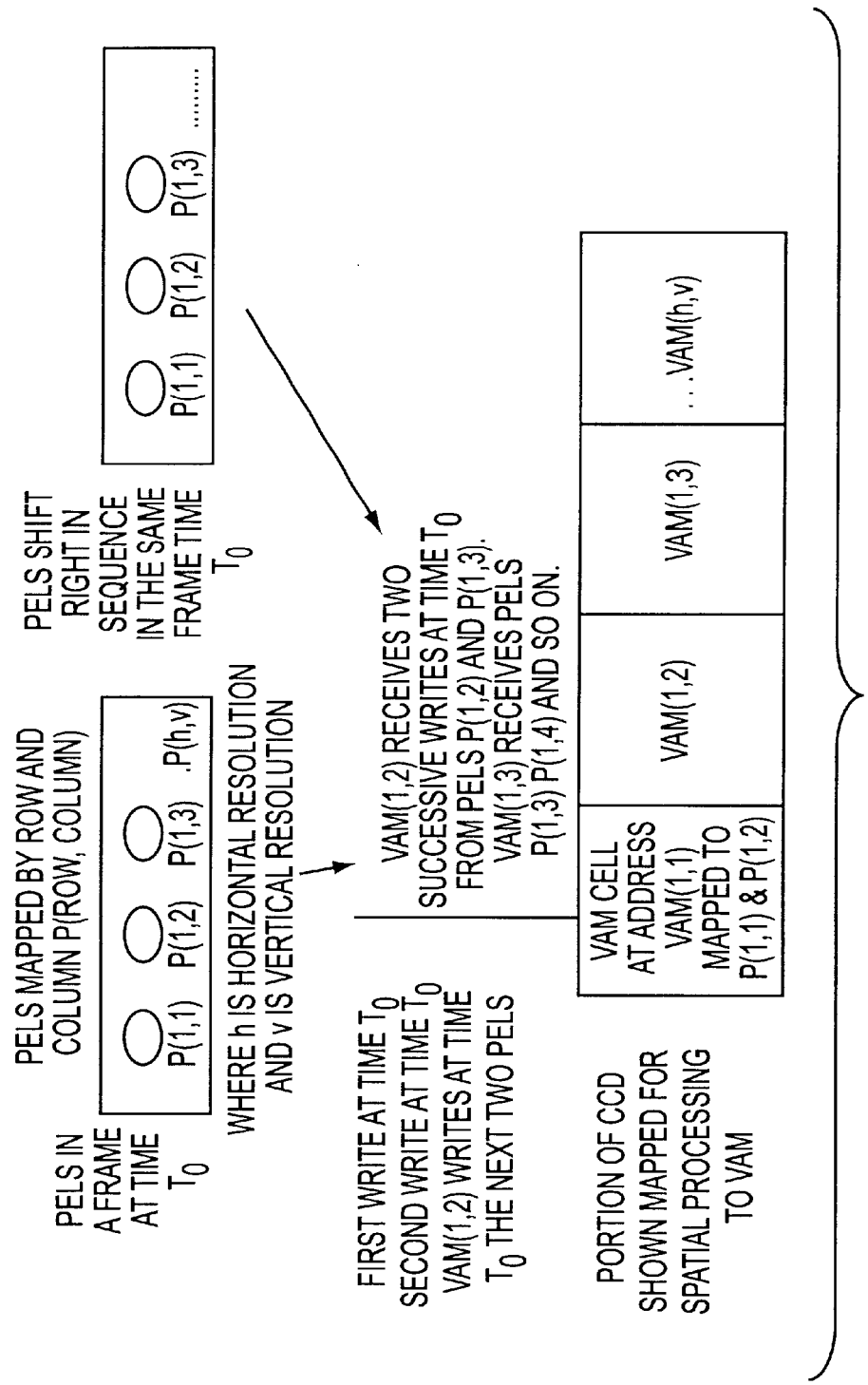
FIG. 6 shows how PELs could be mapped to a VAM cell to achieve spatial processing. Spatial processing differs from temporal in that the process is to locate differences between adjacent pixels. The pixels can be adjacent in the vertical or horizontal direction. The VAM cell is the same cell as used in temporal processing. The difference is in how the VAM is organized with respect to the pixel map. In the figure, a horizontal arrangement is shown. Each pixel is written to VAM twice rather than once in the temporal arrangement. The first Pixel write is to a first VAM address and next write is to the second VAM address. The second pixel write is to second VAM address and the third VAM address. The third pixel address is to the third VAM address and the fourth VAM address. This process of overlapping writes continues. Each VAM cell is then able to compare two adjacent points for change. When a change is detected as in the temporal processing, a flag signal line is set which the processor can quickly detect and respond accordingly.

VAM represents a unique memory type. It is unique in that it retains all the functionality of random access memory but incorporates the ability to retain previous data and make meaningful judgments concerning present data as it relates to previous data. It has the ability to cooperate with the processor and the algorithm in this respect. There are other applications for this type of memory besides video processing. This memory will function in any application where large amounts of raw data are collected that need to be reduced for storage. The VAM design is also suited for spatial processing. FIG. 6 shows an example of spatial processing. For example, seismic data can be reduced for transmission or magnetic storage using a VAM type memory cell. In the seismic spatial application, a single point in space such as point on the earth's surface may be a boundary point between two geological formations. To test this case and identify the point, the write circuitry to a single VAM memory cell would perform two successive writes, representing adjacent points, each write represents a unique point. Each VAM cell then would contain two adjacent points. A cell programmed to test the difference between adjacent points is shown in the model of FIG. 7. Note that there is no requirement for the points to be directly adjacent. Every other point would also fit this adjacent criteria. They can be adjacent horizontally or vertically. Assume the write circuitry is programmed to make two successive writes to the same address location in the VAM memory map. The components of the VAM cell would be programmed to function similarly as in the spatial configuration. That is the radix of each register is adjustable and the error threshold is programmable. Any difference operations which yielded a value less than threshold would cause the zero flag to be set. If any two spatial points were distinctly different to cause the zero flag to be not true then the processor can simply read the zero flag and locate the address of that specific VAM cell or VAM bank. That cell location represents a boundary point. All the cells in a specific region of address range can be very quickly identified to the processor for additional or special processing. The flags from each cell can be aggregated as shown in FIG. 7. The processor can scan the memory bank which represents 1024 (as an example) memory locations in the example shown. The Z_SUM signal is true only when all Z Flags are true. If one Z Flag is not true then Z_SUM is not true. The size of the bank aggregated can be adjusted by the circuit design engineer for optimal performance in a specific configuration. By checking the Z_SUM flags, a processor can quickly scan large memory banks and avoid processing banks not meeting processing criteria as set by the ∈ factor. The above description is of the preferred embodiment of the invention and modifications my be made thereto without departing from the spirit and scope of the invention as defined in the appended claims.

What is claimed is:

1. A method of digitally representing video data comprising generating analog values representing luminosity of pixels of a detected scene, wherein said analog values potentially range from a minimum magnitude to a maximum magnitude to represent luminosities in said detected scene potentially ranging from a minimum luminosity to a maximum luminosity, converting said analog values to digital values, wherein the luminosity in said detected scene at the midpoint between said maximum and said minimum luminosity is represented with a digital value of zero and digitally representing other luminosities in said detected scene as plus or minus differences in the luminosity from said midpoint.

2. A method as recited in claim 1 wherein the least significant bit of a first luminosity value of a block of adjacent pixels having luminosities on the same side of said midpoint represents the sign of the luminosity of all the pixels of said block.

3. A video system comprising a video camera adapted to detect analog values to represent color separations of pixels of a scene being televised, said camera including a detector and being operable to image a color-neutral image of said scene on said detector, said detector detecting said color-neutral image to generate analog values representing the gray scale luminosity of pixels said scene, and an analog-to-digital converter connected to said camera to convert said analog values to digital values to generate sets of digital values representing color separations of said scene in pixel form, and to generate digital values representing the gray scale luminosity of said scene in pixel form, and a Video accumulator Array Memory (VAM) storing said digital values.

4. A video system comprising a video camera adapted to detect analog values to represent color separations of pixels of a scene being televised, and to generate analog values representing the gray scale luminosity of said scene, an analog-to-digital converter connected to said camera to convert said analog values to digital values to generate sets of digital values representing color separations of said scene in pixel form, and to generate digital values representing the gray scale luminosity of said scene in pixel form, a Video accumulator Array Memory (VAM) storing said digital values and a man made infrared light source arranged to illuminate said scene with infrared light so that said gray scale luminosity values include a component corresponding to the infrared illumination of said scene.

* * * * *